United States Patent [19]

Case et al.

[11] Patent Number: 4,962,451
[45] Date of Patent: Oct. 9, 1990

[54] CACHE-EFFECTIVE SORT STRING GENERATION METHOD

[75] Inventors: Douglas R. Case, San Jose; Watson M. Conner, Atherton, both of Calif.

[73] Assignee: International Business Machines Corporation, Armonk, N.Y.

[21] Appl. No.: 796,034

[22] Filed: Nov. 7, 1985

[51] Int. Cl.$^5$ .............. G06F 7/24; G06F 7/06
[52] U.S. Cl. ............ 364/900; 364/962.3; 364/962.2; 364/962.0; 364/966.2
[58] Field of Search ... 364/200 MS File, 900 MS File

[56] References Cited

U.S. PATENT DOCUMENTS

| | | | |
|---|---|---|---|
| 3,713,107 | 1/1973 | Barsamian | 364/200 |
| 3,845,474 | 10/1974 | Lange | 364/200 |
| 4,031,520 | 6/1977 | Rohner | 364/900 |
| 4,037,205 | 7/1977 | Edelberg | 364/900 |
| 4,057,686 | 2/1978 | Calle et al. | 364/200 |
| 4,077,059 | 2/1978 | Cordi et al. | 364/200 |
| 4,210,961 | 7/1980 | Whitlow et al. | 364/300 |
| 4,215,402 | 2/1981 | Mitchell et al. | 364/200 |
| 4,257,097 | 3/1981 | Moran | 364/200 |
| 4,467,411 | 8/1984 | Fry | 364/200 |
| 4,510,567 | 4/1985 | Chang et al. | 364/300 |

OTHER PUBLICATIONS

Knuth, Donald "Art of Computer Programming", vol. 3 Addison-Wesley, Sorting and Searching, 1973, pp. 247-263.

Primary Examiner—David Y. Eng
Assistant Examiner—Eric Coleman
Attorney, Agent, or Firm—R. Bruce Brodie

[57] ABSTRACT

A new use for an LRU-managed cache coupling the main memory of a CPU for sort string generation of m records while minimizing the number of reference misses per record to said cache is described. During a first pass, a partially nested ordering or sort is effectuated using the cache, and then during a second pass a replacement selection merge upon the nested order constrained to fit within the cache is brought about.

2 Claims, 1 Drawing Sheet

REFERENCE STRING 7 0 1 2 0 3 0 4 2 3 0 3 2 1 2 0 1 7 0 1

PAGE FORMS

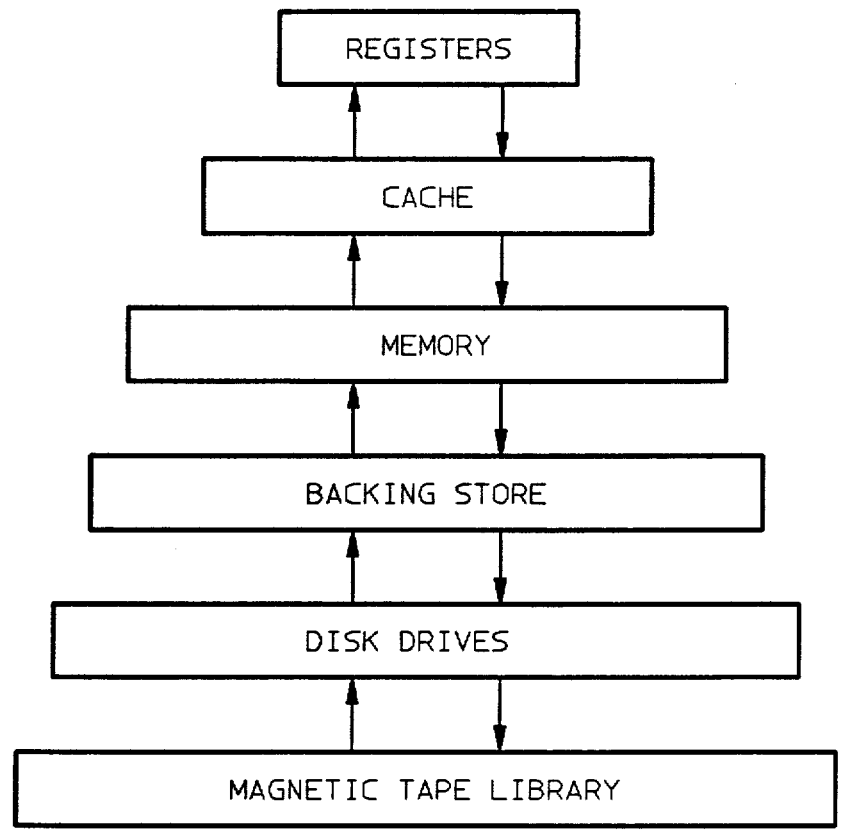
FIG. 1
REFERENCE STRING
7 0 1 2 0 3 0 4 2 3 0 3 2 1 2 0 1 7 0 1
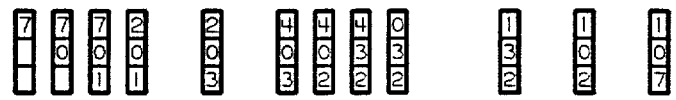
PAGE FORMS          FIG. 2

CACHE-EFFECTIVE SORT STRING GENERATION METHOD

TECHNICAL FIELD

This invention relates to a method for utilizing a cache in a staged storage system for sort string generation while minimizing the number of reference misses per record.

BACKGROUND

Lorin, "Sorting and Sort Systems", Addison-Wesley Publishing Co., copyright 1975, at page 1, defines sorting as a process of arranging items in order. He further points out that while ordering can involve physical ordering, such as the arrangement of a deck of punched cards or records on a magnetic tape, the output of a sorting operation does not necessarily involve an actual or physical rearrangement. In this regard, order in a file may be represented in other ways, particularly by use of an index. The rearrangement of an index or its equivalent is termed "logical ordering" or "rearrangement". Thus, where the elements to be sorted are contained in a linked list, then altering the sorting order consists of altering the pointers, which pointers define the succession of elements in the list.

Modern data processing machines comprise an instruction processor coupled to a hierarchically organized and least recently used (LRU) managed staged storage system containing software and data. The fastest, most rapidly accessed memory closest to the instruction processor is placed at the top of the hierarchy, while progressively slower forms of memory having the bulk of the information written thereon occupies the lower positions within the hierarchy. Because memory costs increase dramatically with speed, many computer systems divide the physical memory subsystem into a number of performance levels. Some of these levels, such as DASD and tape, have traditionally been treated as I/O devices while other levels, such as RAM and cache, have been treated directly by system hardware as main memory. The term "primary storage" or "internal storage" specifies system memory that can be randomly addressed for single read or write transfers. "Secondary" or "external storage" refers to storage that is not randomly addressable and is too slow for direct access or must be accessed in fixed-size blocks.

A cache is a memory with an access time considerably faster than the access times of other forms of randomly accessed memory constituting primary or internal store. Because referencing these forms of memory is managed by the system, the existence of a cache is transparent to the application software. Data is brought into the cache usually in lines that contain the reference data, and a line resides in the cache until it is overlaid with another line. The movement of data in and out of the cache is commonly supported by a hardware implementation of a least recently used (LRU) algorithm. The cache operates on the principle that certain memory locations tend to be accessed often. When a main memory location is read, its contents are stored in the cache at the same time. Further, read references to this location are automatically routed to the cache. A write access usually writes to both main memory and the cache. Since a cache may represent many noncontiguous main memory locations, content-addressable registers are used to determine when a main memory location is currently duplicated in the cache.

Traditionally, sort methods are classified into internal methods and external methods. An internal method is one that can be applied with acceptable performance only to those lists of data that can be completely contained within the primary storage of the processor. An external method is one that reasonably applies to files of data that are too large to fit into the primary store and must therefore rely on external bulk storage devices, such as tape or DASD, during the sorting process. In the process of external sorting, parts of a file are read into primary storage, ordered internally, and then rewritten on the external devices. This process may occur a number of times. In contrast, internal methods are used to rearrange the data developed from pass to pass. Restated, most external sorting methods make a first pass through the file to be sorted, breaking it up into blocks about the size of internal memory, and then sort these blocks. A merge is then performed upon the sorted blocks together by making several passes through the file and creating successively larger sorted blocks until the whole file is sorted. For example, if there is an unordered list of n keys and an internal memory capacity $m < < n$ words, then each sort pass produces n/m sorted blocks. If a p-way merge is performed on each subsequent pass, then log (base key) (n/m) passes may be required.

THE INVENTION

It is accordingly an object of this invention to devise a method to improve sorting operations which utilize CPU primary store or internal memory. It is another object to devise a method to execute sorting operations within cache and to minimize the resources involved in sorting. It is a related object to devise a sorting method in cache which minimizes the number of misses upon referencing.

The invention proceeds from two unexpected observations. The first was that low miss rates in LRU-managed storage were based upon locality of referencing and second, even though such locality might not be observed in sorting operations, the miss rate could still be minimized if the subset of objects to be sorted was kept well within the capacity of cache storage.

The aforementioned objects are achieved by a method for internal multiple pass sorting of records in a staged storage system in which a cache is a repository for the keys of the records currently being sorted. The method steps comprise, during a first pass, (a) calling into the cache and sorting of an unordered subset of the keys of the records to form an ordered subset, and (b) repeating step (a) until the set of keys of the records has become exhausted. The method comprises the further steps, during a second pass, of (c) merging elements of multiple ordered subsets of keys in the cache using replacement selection until an ordered output has been obtained, and dynamically constraining the replacement selection such that the subsets fit within the cache and that there is no more than one cache referencing miss per record during sorting.

It is recognized that Knuth, "Art of Computer Programming", Vol. 3, Sorting and Searching, copyright 1973, pp. 251-266, describes replacement selection sorting. It is also recognized that other references such as Whitlow et al, U.S. Pat. No. 4,210,961, "Sorting System", issued Jul. 1, 1980, address the minimization of computing resources attendent to an n-way merging of ordered strings in a sort/merge operation. Whitlow selectively reverses, prior to the merge, the direction of ordering of some of the strings as a function of a comparison match between actual and predicted string size.

The state of the art is also illustrated by Chang et al, U.S. Pat. No. 4,417,321, issued Nov. 22, 1983, and U.S. Pat. No. 4,510,567, issued Apr. 9, 1985, both entitled "Qualifying and Sorting File Record Data". Also of interest is Sedgewick, "Algorithms", Addison-Wesley Publishing Co., Chapter 11, Priority Queues, copyright 1983. Sedgewick proposes an abstract data type in which, for each new element inserted into a queue, the largest magnitude element is deleted therefrom. Relatedly, the Chang patents implement a variation of Sedgewick's priority queue as applied to sorting and staging from a mass store to an office system. Chang's sorting method is biased in favor of excluding the lowest ranked element from the list or buffer.

The above-cited references, singly or in combination, neither teach nor suggest the invention; namely, a multiple pass sort and merge in which both the sort and merge passes are dynamically constrained over a cache. This means that during the first pass the number of elements within each unordered subset filling the cache, as well as the number of elements involved in each merge cycle, must fit within the cache during their respective passes. Also, while replacement selection is the merge method of choice, other merge techniques may be used although at some sacrifice in the time necessary to complete operation. In all cases, however, the number of misses per record approximates no more than one miss during sorting.

BRIEF DESCRIPTION OF THE DRAWING

FIG. 1 depicts a processor and its associated staged storage system partitioned accordingly as to internal (RAM) and non-RAM access usage and including a cache.

FIG. 2 illustrates the hit and miss effects upon an LRU-managed cache subject to a reference string.

DESCRIPTION OF THE PREFERRED EMBODIMENT AND INDUSTRIAL APPLICABILITY

In this description, FIGS. 1 and 2 represent aspects of the prior art pertinent to an appreciation of the method of this invention.

In practice, a cache is subject to contention such that control of it may be switched from a sorting task to another task or vice versa by some external scheduler resident within the processor. When the sort task has control, the cache becomes loaded with a portion of the string to be ordered as the portion is sorted. In the event the sorting task becomes interrupted, another task may take control and flush the task of the partially sorted results. While the cache is being flushed, only those entries which are modified are copied back to memory. When the sort task regains control, it resumes where it left off, note being taken that the partially sorted results were previously stored. In practice, the cache is always LRU managed, whether involved in a sort task or not. Because the cache is LRU managed, the pattern of reference determines the cache contents. If the set of referenced objects is much larger than the cache capacity, then the cache contents are partially replaced when referencing objects. The main idea in this invention is to keep the substring being sorted within the cache small enough so that the cache LRU discipline is NOT invoked. In determining how small to make the substring size, the number the lines in the cache and the depth of the substring must be taken into account.

Referring now to FIG. 1, there is shown a typical arrangement of memories in a hierarchy available in most systems. When a memory access is made by way of execution of an instruction in the processor, the contents of the accessed location, as previously mentioned, plus its neighbors are copied into a cache. If another reference is made to these locations, it can be fetched directly from the cache without having to go to the slower speed main memory. The environment illustrated by FIG. 1 is that of demand paging information from the lower depths or echelons of memory so that it is resident in more accessible portions thereof as some function of demand and dereferencing or migration downward of those portions of information that are not of present interest to executing tasks. Superimposed upon this virtual memory demand paging model is a multiprogramming or contention model wherein tasks are suddenly switched by way of interrupt so that flushing and reconstitution of an appropriate working set must be built up until the current task is switched out and the associated working set purged.

Referring now to FIG. 2, there is shown an example of least recently used (LRU) managed cache. The LRU-managed cache associates with each reference the time of its last use. When an element must be replaced, the LRU scheme chooses that element in the cache which has not been used for the longest period of time. This form of replacement looks backward in time rather than forward. The result of applying LRU to a cache reference string is shown in FIG. 2. This produces 12 misses. When the reference to element 4 occurs, however, the LRU sees that, of the three elements in the cache, element 2 was used least recently. The most recently used was element 0 and just before that, element 3 was used. Thus, LRU replaces element 2, not knowing that it is about to be used. When it then misses by way of a reference to element 3, the LRU replaces element 0 since, of the three elements in the cache, element 0 was the least recently used.

As may be recalled, the invention is directed to a method for internal multiple pass sorting of records in a staged storage system in which a cache is a repository for the keys of the records currently being sorted. This method has broadly two steps. These are (a) sorting subsets of the records until the set (string) is exhausted; and (b) replacement selection sorting of r levels of r-layered subsets of records such that the subsets are dynamically constrained to fit within the cache, and that there occurs no more than one cache referencing miss per record during the sorting within a level. It should also be appreciated that the method includes the initialization step of computing parameters such as the size s of each of the subsets to be sorted during a first pass. If a merge phase involves several merge subpasses, such as an n-way and t-way merge, then the parameters n and t must also be computed. Note that n and t also correspond to the number of nodes on a selection tree.

In order to assist the conceptual appreciation of this invention, it shall be described in terms of eight steps. Steps 1-3 correspond to the initialization step, while step 4 corresponds to sorting step (a). The remaining steps, 5-8, are the generalized counterpart of the replacement selection merge step (b).

CACHE EFFECTIVE SORT STRING GENERATION METHOD

Step 1: Compute a size t for an output tree to be used to merge ordered lists of records.

Choose t to be as large as possible while being limited such that the tree merge operation will still have a low cache-miss ratio.

t is a function of the size of the cache, the characteristics of the tree merge operation (i.e. how much data is referenced in this tree merge operation), and the size of the records and the keys being sorted.

Step 2: Compute a set size s for sets of unordered records to be sorted to create initial ordered lists for tree merge operations.

Choose s to be as large as possible while being limited such that the sort operation will still have a low cache-miss ratio.

s is a function of the size of the cache, the characteristics of the sort operation that create the initial ordered lists (i.e. how much data is referenced in this sort operation), and the size of the records and the keys being sorted.

Step 3: Compute n, the number of ordered lists of size s that need to be merged to create an ordered list for the output tree.

Choose n so that the sort operation will have a low cache-miss ratio.

For a given t and s, n is a function of the main storage available to the program and the size of the records. More precisely, for a given t and s, n is a function of how many records may be in storage at one time. n is chosen to be the minimum of the number of records that may be in storage at one time divided by the product of t times s, and t (the maximum number of ordered lists that may be merged together using a tree merge operation while having a low cache-miss ratio).

Step 4: Obtain s input records and sort them. Repeat this step until main storage is full.

Step 5: Select an intermediate set of n of the ordered lists produced in step 4. If n is one, then add up to t ordered lists produced in step 4 to the output tree, and go to step 8.

Step 6: Remove t or fewer lists from the intermediate set, merge them, and add the resulting ordered list to the intermediate set. Repeat this step until the intermediate set is reduced to a single ordered list.

Step 7: Add the single intermediate set list to the output tree. If n or more lists remain from step 4, go to step 5.

Step 8: Merge records from the lists on the output tree until the work file buffers are filled. Write the work file buffers. If there are more records yet to be processed, go to step 4.

In step 1, there is computed a size t for an output tree to be used to merge ordered lists of records. t should be selected so that the tree merge operation will have a low cache miss ratio. In step 2, there is computed a size for subset s which represents an upward bound on the depth or cardinality of the subset that can fit within the cache for subsets of unordered records to be sorted to create the initial ordered lists or tree merge operations. Again, s is selected so that the sort operations will have a low cache miss ratio. In step 3, the number n of sorted subsets of size s that need to be merged to create an ordered list for the output tree is determined. The number n is a function of the available main storage and would vary for any given t and s.

Step 4 involves the obtaining of s input records and sorting them. This step would be repeated until main storage is full.

As indicated, steps 5–8 correspond to the multiple subpass merging step. In this regard, step 5 involves selecting an intermediate set of n of the ordered lists produced in step 4. If n is 1, then merely take t ordered lists, produced in step 4, and transfer them to the output tree and jump to step 8. Step 8 includes the merging of records from the lists on the output tree until the work file buffers are filled. When these buffers are filled, they are then written. If there are more records yet to be processed, a return must be made to step 4. If indeed n is 2 or more, then a branch is made to step 6. At this point, t or fewer lists from the intermediate set are removed and merged with the resulting ordered list being added to the intermediate set. This step is repeated until the intermediate set is reduced to a single ordered list.

If the LRU-managed cache has a capacity of storing g keys above which capacity at least one cache resident key would be flushed on the next miss reference to said cache, then during the first pass (s < g) keys at a time are called into cache and arranged in a partially nested order. This is repeated for each of m/s subsets of keys stored in main memory. A second pass for merging the partially sorted results can be implemented using a (t < s) way replacement selection merge. In this merge, at least one key is called into the cache from each of t of the m/s subsets. This is repeated until the merge has been completed on a replacement selection basis.

Two sorting examples using a cache in a staged storage system will be illustrated. Both examples will sort 12 records in memory. The first example illustrates sorting according to the prior art, while the second example exercises the method of the invention. It will be assumed that only four records at a time can be kept within the cache for purposes of these examples. Instead of replacement selection, the methods shown for sorting will be simply that of traversing a list and selecting the smallest element in the list. The same principles to illustrate the effects of cache misses would apply likewise to replacement selection. With reference to the examples, the records are assumed to be linked together in logical order using pointers; the sorting method of the invention involves merely rewriting the pointers.

TABLE 1

| Illustrative Example of the Prior Art Method |  |
| --- | --- |
| Sort all records in memory, moving sorted records to work buffers or other output area as appropriate. Records in main memory area are assumed to be initially linked into the following order, but not necessarily assumed to be in physical order. Assume the following 12 records: | |
|  | Z |
|  | G |
|  | B |
|  | A |
|  | K |
|  | R |
|  | L |
|  | D |
|  | P |
|  | U |
|  | M |
|  | Y |
|  | 2 |
| Sorting method: | Traverse list searching for lowest record and remove it. Traverse list again, removing new lowest record and remove it, etc. This technique was chosen instead to make it easier to illustrate. The |

TABLE 1-continued
Illustrative Example of the Prior Art Method same principles involving cache hits and misses would apply using replacement selection.

The cache will be assumed to be able to hold four records and will also be assumed to be initially empty (denoted by 0's).

Cache initially:  0
        0   − cache miss
        0   + cache hit
        0
        2

Compare 1st record (Z) to 2nd record (G).
Cache after comparison:    Z −
G   −
0
0
2         2

Compare lowest record so far (G) with 3rd record (B).
Cache after comparison:    G +
B   −
Z
0

Compare lowest record so far (B) with 4th record (A):
    B +
    A −
    G
    Z Compare lowest record so far (A) with 5th record (K):
    A +
    K −
    B
    G Note that Z has been flushed from the cache.
Compare lowest record so far (A) with 6th record (R):
    A +
    R −
    K
    B Note that G has been flushed from the cache.
The first pass continues with the last comparison of the first pass as follows:
Compare lowest record so far (A) with 12th record (Y):
    A +
    Y −
    M
    U Note that all of the records from the beginning of the list, except A, have been flushed from the cache.
A is found to be the lowest record, so it is moved to the buffer or output area. After the first pass, A is removed and records in the memory area now appear as follows:
    Z
    G
    B
    K
    R
    L
    D
    P
    U
    M
    Y The second pass is then started, again traversing the list looking for the lowest record remaining in the list.
Compare 1st record (Z) to 2nd record (G):
    Z −
    G −
    A
    Y Note that M and U have been flushed from the cache.
Compare lowest record so far (G) with 3rd record (B):
    G +
    B −
    Z
    A Note that Y has been flushed from the cache.
Compare lowest record so far (B) with 4th record (K):
    B +
    K −
    G
    Z Note that A has been flushed from the cache.
Compare lowest record so far (B) with 5th record (R):
    B +
    R −
    K
    G Note that Z has been flushed from the cache.
Compare lowest record so far (B) with 6th record (L):
    B +
    L −
    R
    K Note that G has been flushed from the cache.
The second pass continues with the last comparison of the second pass as follows:
Compare lowest record so far (B) with 11th record (Y):
    B +
    Y −
    M
    U B is found to be the lowest record, so it is moved to the buffer or output area. After the second pass, there are 10 records in the memory area. This continues for all 11 passes.
Note that there is one cache miss per record on each pass through the data.
Let x be the number of records. There are $x - 1$ passes through the data. The average length of the list on a pass is $x/2$. Since there is one cache miss per record per pass, the total number of cache misses is roughly
$$x/2(x - 1) = (x^2 - x)/2.$$
In this example where x is 12, $(x^2 - x)/2 = 66$.

TABLE 2
Illustrative Example of the Method According to the Invention

The following is an illustrative example of the invention in action. This is tied to steps 1-8 described in the preceding description.

Step 1:  Assume the size of the output tree t is computed to be 3.
Step 2:  Assume the size of the set of unordered records s is computed to be 4.
Step 3:  Assume the number of sorted sets n is computed to be 1.
Step 4:  Obtain s (4) input records and sort them. Repeat this until main storage is full (assuming only 12 records are needed to fill up storage).

Assume storage is full with the same 12 records shown in the earlier example illustrating the number of cache misses when using prior art techniques. Assume cache can hold 4 records as in previus example:
    Z
    G
    B
    A
    K
    R
    L
    D
    P
    U
    M
    Y Sort the first s (4) records in memory:
    Z
    G
    B
    A First, compare 1st record (Z) to 2nd record (G):
    Z −
    G −   − cache miss
    0     + cache hit
    0

Compare lowest record so far (G) with 3rd record (B):
    G +
    B −
    Z

TABLE 2-continued
Illustrative Example of the Method According to the Invention

```
Compare lowest record so far (B) with 4th record (A):
                    B +
                    A −
                    G
                    Z
A is found to be the lowest record, so it is linked to be
the first record in the ordered list. Records in the
memory area now appear as follows:
                    Z
                    G
                    B
At this point, the cache contents appear as follows:
                    A
                    B
                    G
                    Z
None of the s (4) records have been flushed from the cache
during the first pass.
Start first phase of the second pass.
Compare 1st record (Z) to 2nd record (G):
                    Z +
                    G +
                    A
                    B
Compare lowest record so far (G) to 3rd record (B):
                    G +
                    B +
                    Z
                    A
B is found to be the lowest record, so it is linked to the
second record in the ordered list. Records in the memory
area now appear as follows:
                    Z
                    G
Note that none of the 4 records have been flushed from the
cache during the second phase of the second pass.
                    B
                    G
                    Z
                    A
Start second phase of the second pass.
Compare 1st record (Z) to 2nd record (G):
                    Z +
                    G +
                    B
                    A
G is found to be the lowest record, so it is linked to the
third record in the ordered list. The only remaining
record is Z, so it is then linked to the fourth record in
the ordered list. The ordered list is now in the
following logically sorted order:
                    A
                    B
                    G
                    Z
Note that none of the 4 records have been flushed from the
cache in the third phase of the second pass.
                    Z
                    G
                    B
                    A
Note that while one cache miss per record occurred on the
first pass, no cache misses occurred on the subsequent
passes.
Step 4 is repeated until main storage is full. That is,
in the example, subsequent sets of s (4) records are
sorted into ordered lists and the result is the following
t (3) linked lists:
            A           D           M
            B           K           P
            G           L           U
            Z           R           Y
The sorting of the other two subsets of records is not
shown, but it is done the same way in which the subset
(ZGBA) was sorted. Again note that for all of these
subsets, there was only one cache miss per record.
Step 5: n is one, so the t (3) ordered lists are added
        to the output tree and then skip to step 8.
Step 8: Merge the records in the t (3) ordered lists
```

TABLE 2-continued
Illustrative Example of the Method According to the Invention

```
produced in step 4.
The following is the initial structure of the output tree
and four linked lists of ordered records in the memory
area:

|
                       /|\
                      / | \
                     /  |  \
                    /   |   \
                   ↓    ↓    ↓
                   A    D    M
                   B    K    P
                   G    L    U
                   Z    R    Y

Again, assume that to sort the records that are at the
front of each list, traverse the records being sorted
searching for the lowest record and remove it, traverse
the list again, removing the new lowest record, etc.
Compare 1st record (A) to 2nd record (D):
                    A −
                    D −
                    0
                    0
Compare lowest record so far (A) to 3rd record (M):
                    A +
                    M −
                    D
                    0
A is found to be the lowest record, so it is moved to the
buffer or output area. The next record in the ordered
list A was in (B) is entered into the merge. Note that no
cache flush occurred; the only cache misses are for the
first reference to each record. The structure of the
output tree and the four linked lists of ordered records
in the memory area are as follows:

|
                       /|\
                      / | \
                     /  |  \
                    /   |   \
                   ↓    ↓    ↓
                   B    D    M
                   G    K    P
                   Z    L    U
                        R    Y

Again compare the records at the top of each list, looking
for the lowest record.
Compare record from 1st list (B) to record from 2nd list
(D):
                    B −
                    D +
                    A
                    M
Compare lowest record so far (B) to record from 3rd list
(M):
                    B +
                    M +
                    D
                    A
B is found to be the lowest record, so it is moved to the
buffer or output area. The next record in the ordered
list B was in (G) is entered into the merge. Note that no
cache flush occurred; the only cache miss was for the
first reference of a record. The structure of the output
tree and the three linked lists of ordered records in the
memory area are now as follows:
```

TABLE 2-continued

Illustrative Example of the Method According to the Invention

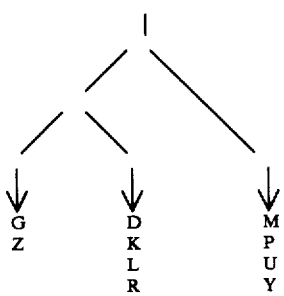

Again compare the records at the top of each list, looking for the lowest record.
Compare record from 1st list (G) to record from 2nd list (D):

G −
D +
B
M

Note that A is flushed from the cache, but A has already been moved to the output area; it is no longer in the merge.
Compare lowest record so far (D) to record from 3rd list (M):

D +
M +
G
B

D is found to be the lowest record, so it is moved to the buffer or output area. The next record in the ordered list D was in (K) is entered into the merge. Note that the only cache flush was for a record that had already been moved to the output area, and is thus no longer in the merge. The structure of the output tree and the three linked lists of ordered records in the memory area as now as follows:

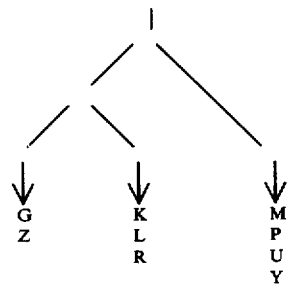

This continues in this manner until all of the records in all three lists have been moved to the buffer or output area in sorted order. The significant point to note here is that there was only one cache miss per record in the merge in step 8, and that was when the record was first referenced. After that, the record remains in the cache until it has been selected in the merge and moved to the buffer or output area.
Note that in the merge in step 8, while one cache miss per record occurred when each record entered the merge (became the lowest record in its ordered list), no cache misses occurred on the subsequent passes. In step 4, there was also only one cache miss per record.
Thus, for all the steps where x is the number of records, this example shows 2x total cache misses.
The prior art method showed $(x^2 − x)/2$.
This means that only 24 misses occurred in the method of the invention, as opposed to 66 misses for the prior art method. The difference between the number of cache misses between the two methods would become even more significant as the number of records x grows larger. In reality,

TABLE 2-continued

Illustrative Example of the Method According to the Invention more than 4 records fit in the cache, and more than 12 records fit in memory. This means that the ratio of the number of cache misses between the two methods would be much more significant than the 24 to 66 cache misses illustrated in the above example.

Having thus described the invention with particularity, what is desired to be protected by Letters Patent is set forth in the following claims.

We claim:

1. A new use for an LRU-managed cache coupling the main memory of a CPU for sort string generation of m records while minimizing the number of reference misses per record to said cache, said sort string generation being manifest as a nested ordering of keys of the records, said cache having a storage capacity of g keys above which capacity at least one cache resident key would be flushed on the next miss reference to said cache, comprising the steps of:

(a) during a first pass, repeatedly calling one of m/s subsets of (s<g) keys of the records resident in main memory into cache, arranging the called subset into a partial nested ordering thereof, and writing the nested ordering to main memory until m/s subsets have been exhausted; and (b) during a second pass, repeatedly executing a (t<s) way replacement selection merge in the cache from among at least one key selected from each of t partial nested orderings of the subsets resident in main memory until the m/s such orderings become exhausted.

2. In a CPU having a main memory for storing program sequences and records, an LRU-managed cache coupling said main memory, and means responsive to program sequences for accessing the contents of main memory and the cache such that:

(1) upon a main memory location being read and its contents being concurrently stored in the cache, further read references to the main memory location being routed to the cache, and (2) upon a main memory location being written, the same contents being concurrently written into cache, a new use for the LRU-managed cache for sort string generation of m records while minimizing the number of reference misses per record to said cache, said m records being initially stored in main memory, said sort string generation being manifest as a nested ordering of keys of the records, said cache having a storage capacity of g keys above which capacity at least one cache resident key would be flushed on the next miss reference to said cache, comprising the steps of:

(a) during a first pass, repeatedly calling one of m/s subsets of (s<g) keys of the records resident in main memory into cache, arranging the called subset into a partial nested ordering thereof, and writing the nested ordering to main memory until m/s subsets have been exhausted; and (b) during a second pass, repeatedly executing a (t<s) way replacement selection merge in the cache from among at least one key selected from each of t partial nested orderings of the subsets resident in main memory until the m/s such orderings become exhausted.

* * * * *

UNITED STATES PATENT AND TRADEMARK OFFICE
CERTIFICATE OF CORRECTION

PATENT NO. : 4,962,451

DATED : October 9, 1990

INVENTOR(S) : Douglas R. Case and Watson M. Conner

It is certified that error appears in the above-identified patent and that said Letters Patent is hereby corrected as shown below:

```
In column 6, line 64, delete "2".
In column 7, line 12, delete "2".
In column 7, lines 14 - 16 should be centered as follows:   Z -
                                                            G -
                                                            O
                                                            O
In column 7, line 17, delete "2".
In column 7, lines 19 - 21 should be centered as follows:   G +
                                                            B -
                                                            Z
                                                            O
```

Signed and Sealed this

Third Day of March, 1992

Attest:

HARRY F. MANBECK, JR.

*Attesting Officer*  *Commissioner of Patents and Trademarks*